United States Patent [19]
Funada et al.

[11] Patent Number: 5,729,357
[45] Date of Patent: Mar. 17, 1998

[54] IMAGE PROCESSING APPARATUS

[75] Inventors: Masahiro Funada; Shinobu Arimoto; Michio Kawase, all of Yokohama, Japan

[73] Assignee: Canon Kabushiki Kaisha, Tokyo, Japan

[21] Appl. No.: 361,470

[22] Filed: Dec. 22, 1994

Related U.S. Application Data

[63] Continuation of Ser. No. 561,098, Aug. 1, 1990, abandoned.

[30] Foreign Application Priority Data

Aug. 2, 1989 [JP] Japan ........................ 1-199344
Aug. 2, 1989 [JP] Japan ........................ 1-199345

[51] Int. Cl.$^6$ ................................................. H04N 1/393
[52] U.S. Cl. ........................ 358/451; 358/448; 382/298
[58] Field of Search ................................. 358/451, 426, 358/448, 444, 401; 382/232, 298, 299, 300; H04N 1/393

[56] References Cited

U.S. PATENT DOCUMENTS

| | | | |
|---|---|---|---|
| 4,532,602 | 7/1985 | Du Vall | 364/577 |
| 4,797,945 | 1/1989 | Suzuki et al. | 382/56 |
| 4,841,375 | 6/1989 | Nakajima et al. | 358/451 |
| 4,893,195 | 1/1990 | Tada et al. | 358/451 |
| 4,903,145 | 2/1990 | Funada | 358/462 |
| 4,907,171 | 3/1990 | Nagashima | 358/451 |
| 4,912,566 | 3/1990 | Tasaka | 358/451 |
| 4,939,590 | 7/1990 | Tada | 358/451 |
| 4,953,014 | 8/1990 | Takaragi | 358/77 |
| 5,029,017 | 7/1991 | Abe et al. | 358/451 |
| 5,046,117 | 9/1991 | Yamashita | 382/47 |
| 5,053,886 | 10/1991 | Nakajima | 358/448 |
| 5,083,216 | 1/1992 | Abuyama | 358/451 |
| 5,189,529 | 2/1993 | Ishiwata et al. | 358/451 |

Primary Examiner—Thomas L. Stoll
Attorney, Agent, or Firm—Fitzpatrick, Cella, Harper and Scinto

[57] ABSTRACT

An image processing apparatus inputs image signals by a plurality of pixels in synchronism with a predetermined clock; designates a reduction ratio of an image represented by the input image signals; cumulatively adds a value on the basis of the inverse of the designated reduction ratio in synchronism with the predetermined clock and holds a value of predetermined number of lower significant digits of the added value; and thins out and interpolates image signals input by the input means in accordance with whether or not the value held by the addition means exceeds a predetermined value.

11 Claims, 13 Drawing Sheets

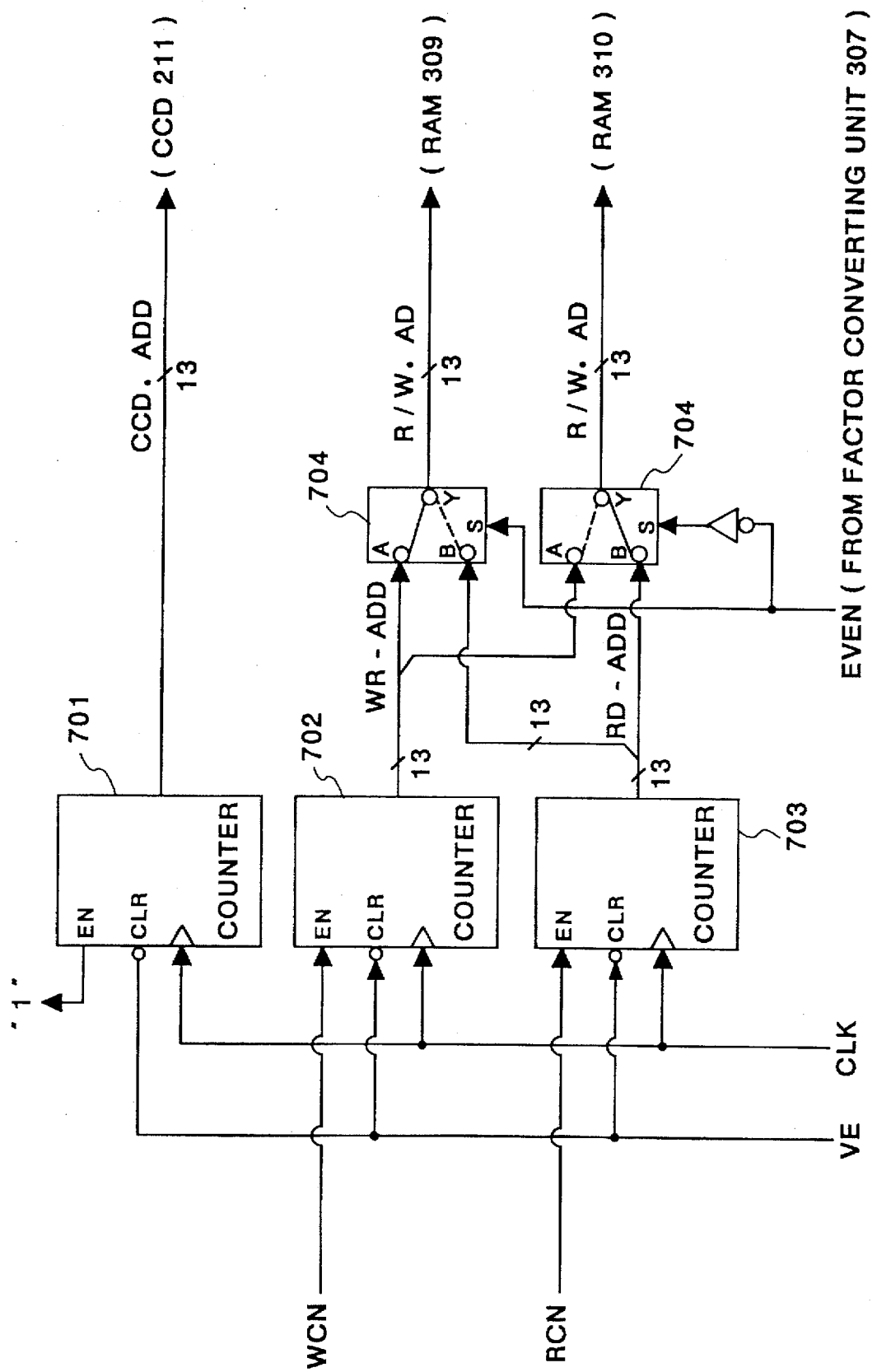
F I G. 6

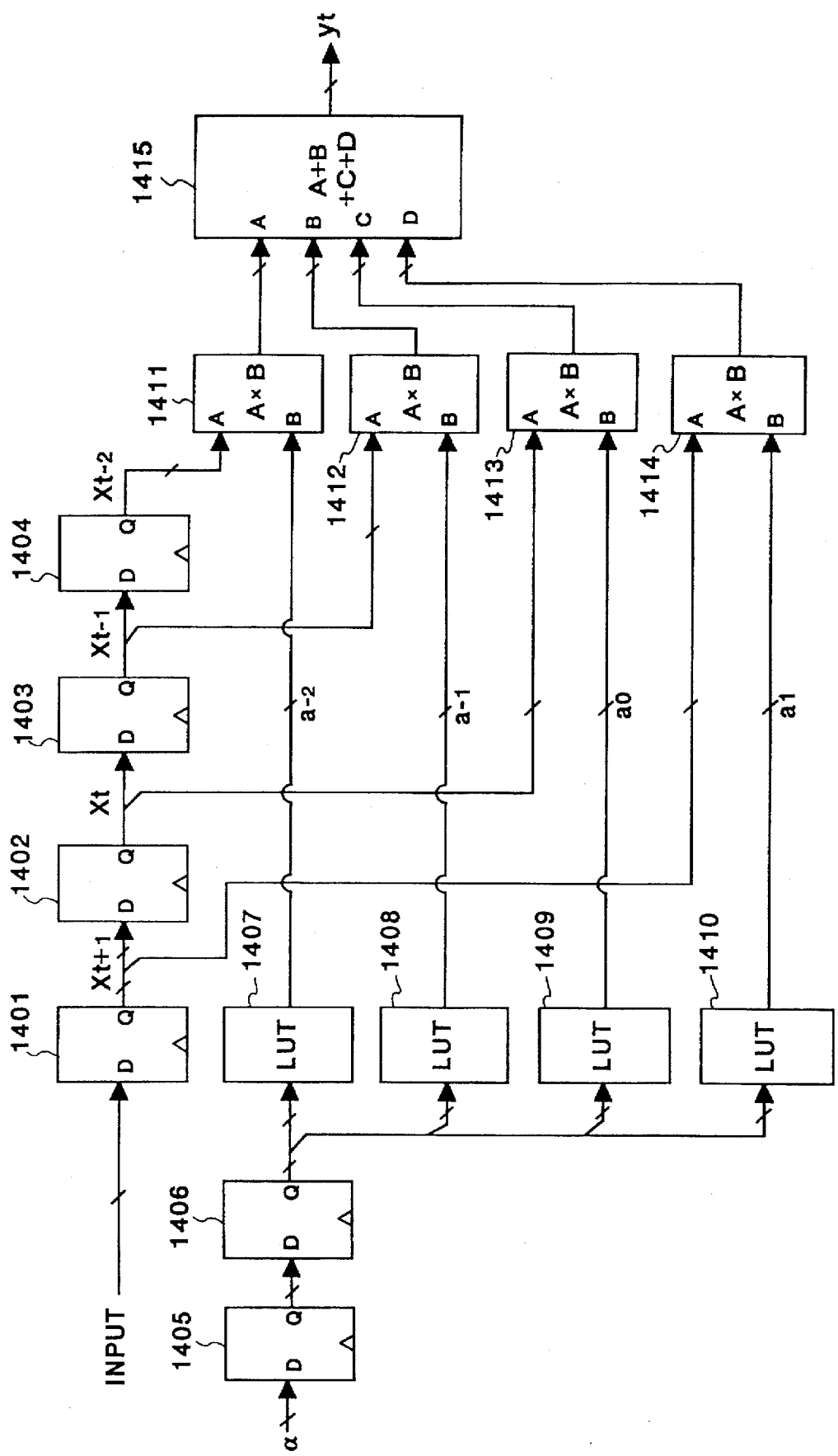
F I G. 14

IMAGE PROCESSING APPARATUS

This application is a continuation of application Ser. No. 07/561,098 filed Aug. 1, 1990, now abandoned.

BACKGROUND OF THE INVENTION

The present invention relates to an image processing apparatus, and more particularly, to an image processing apparatus for performing a factor conversion process on image data.

Conventional image processing apparatuses of the above-described type perform the factor conversion process on an image by changing the speed at which image data stored in a memory is read in.

However, in the conventional image enlarging process, the same image data is read out a few times, generating a roughened image. Furthermore, the image reduction process degrades the image quality due to lack of the pixel data.

The same problems occur in the edging process, greatly deteriorating the image quality.

SUMMARY OF THE INVENTION

The present invention is directed to eliminating the aforementioned disadvantages of the prior techniques, and has an object of providing an image processing apparatus which is capable of eliminating deterioration in the image quality which would occur when the size of a multi-level image is reduced.

A second object of the present invention is to provide an image processing apparatus which is capable of eliminating deterioration in the image quality which would occur when an enlargement process is conducted on a multi-level image.

A third object of the present invention is to provide an image processing apparatus which is capable of eliminating deterioration in a multi-level image and a character obtained by a line drawing which would occur when a reduction process is conducted.

A fourth object of the present invention is to provide an image processing apparatus which is capable of eliminating deterioration in a multi-level image and a character obtained by a line drawing which would occur when an enlargement process is conducted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a block diagram of an address controller 302 of the image processing apparatus of FIG. 1;

FIG. 14 is a block diagram of a sinc interpolater, showing a second embodiment of the present invention.

DESCRIPTION OF THE PREFERRED EMBODIMENTS

A first embodiment of the present invention will be described with reference to the accompanying drawings.

Figure 2:
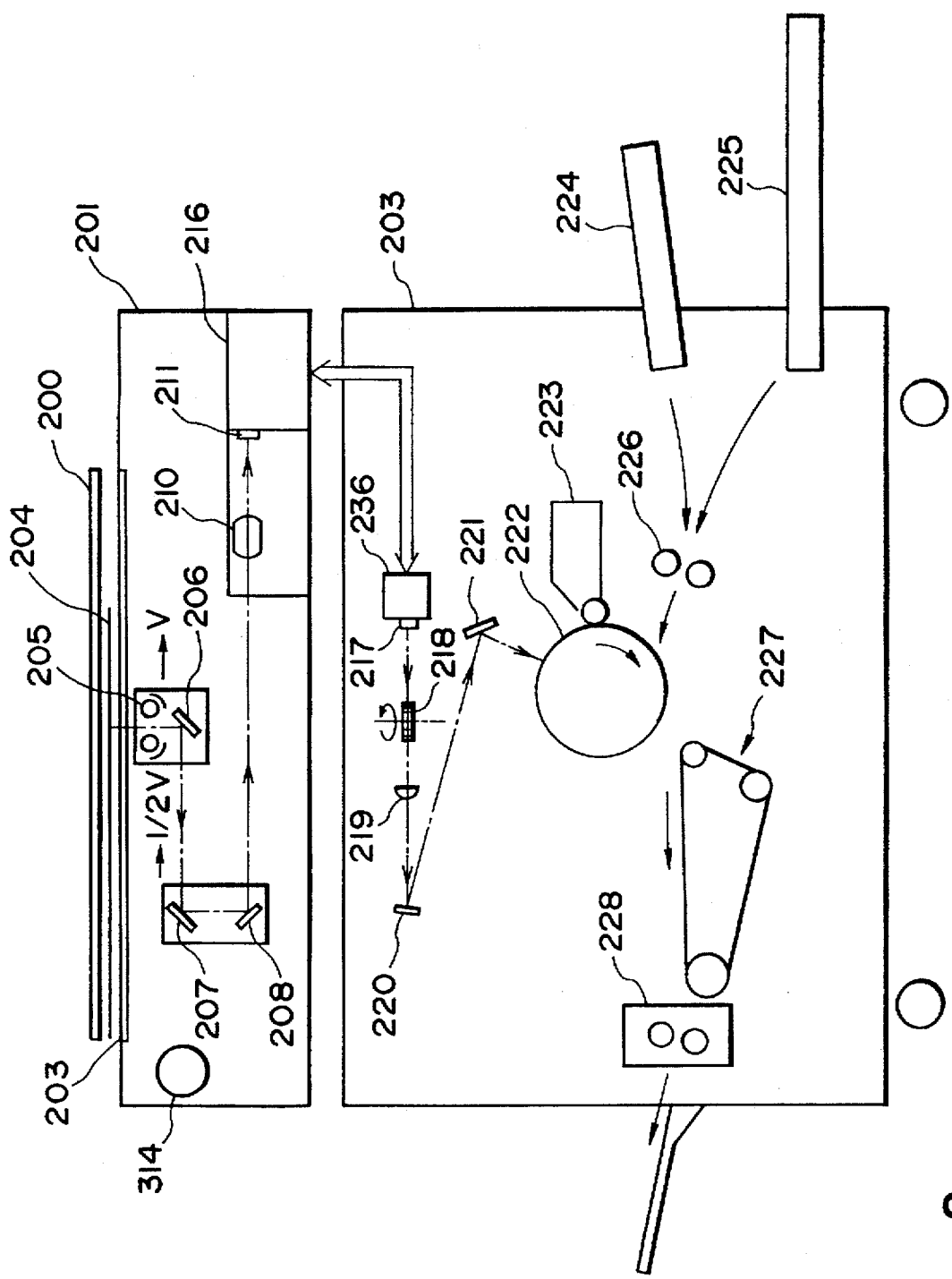
FIG. 2 is a schematic cross-sectional view of the image processing apparatus of FIG. 1.

FIG. 2 is a schematic cross-sectional view of an image processing apparatus (copier), showing the first embodiment of the present invention.

As shown in FIG. 2, the image processing apparatus consists of an image reader unit 201 for electrically reading an image of a document and for performing a factor conversion process on the image which is read, and a printer unit 203 for recording an image on the basis of the image data on which the factor conversion process is conducted.

In the image reader unit 201, a document 204 placed on a document base glass 203 is held at its place by a document retainer 200. The document 204 is illuminated by a lamp 205. The light reflected by the document 204 is led to a lens 210 through mirrors 206, 207 and 208 then to a CCD 211.

When the document 204 is to be read, the lamp 205 and the mirror 206 are moved in a vertical scanning (subscanning) direction at a speed V whereas the mirrors 207 and 208 are moved in the same direction at a speed of ½ V. For enlargement or reduction in the size of an image in the vertical scanning direction, this scanning speed V is varied.

That is, if the scanning speed when the image data is read at a rate of 100% (the same size) is V0, the scanning speed V when the reading rate is m % is obtained by the following equation:

$$V = \frac{100}{m} \times V_0 \qquad (1)$$

Factor conversion process in a horizontal scanning (main-scanning) direction is conducted by means of a signal processing unit 216. The image signal on which the factor conversion process is conducted is sent to the printer unit 203.

In the printer unit 203, a laser driver 236 turns on and off a semiconductor laser element 217 on the basis of the image signal sent from the image reader unit 201. The laser beam emitted from the semiconductor laser element 217 is reflected by a polygon mirror 218 then through a f-θ lens 219 and mirrors 220 and 221 and forms an image on the surface of a photosensitive drum 222. The image formed on the surface of the photosensitive drum 222 is developed by a known electrophotographic process and thereby made visible. That is, the latent image formed on the surface of the photosensitive drum 222 is developed by means of a toner supplied from a developer 223. A sheet of recording paper is supplied from a paper cassette 224 or 225. The sheet of recording paper is first fed to a register roller 226, then toward the photosensitive drum 222 in a predetermined timing which is attained by the register roller 226. The toner image formed on the photosensitive drum 222 is transferred onto the sheet of recording paper. Thereafter, the sheet of recording paper is fed to a fixing unit 228 by a conveying unit 227 where the image on the recording paper is fixed thereto. Subsequently, the sheet of recording paper is fed out of the image processing apparatus.

Figure 13A:
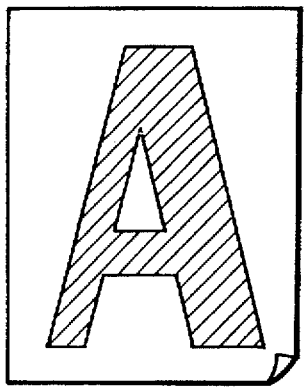
FIGS. 13A to 13D show-examples of the image processings conducted in the first embodiment.
Figure 13B:
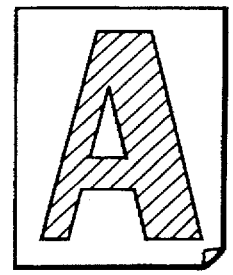
Figure 13C:
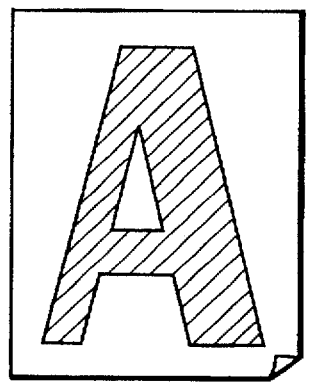
Figure 13D:
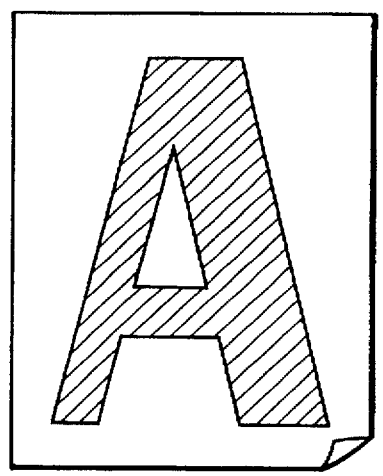

FIG. 13A shows an example of an image of a document on which image processing is to be conducted, FIG. 13B shows an example of a copied image on which the size reducing process is conducted, FIG. 13C shows an example of a copied image whose size remains the same, and FIG. 13D shows an example of a copied image on which the size enlarging process is conducted.

Figure 1:
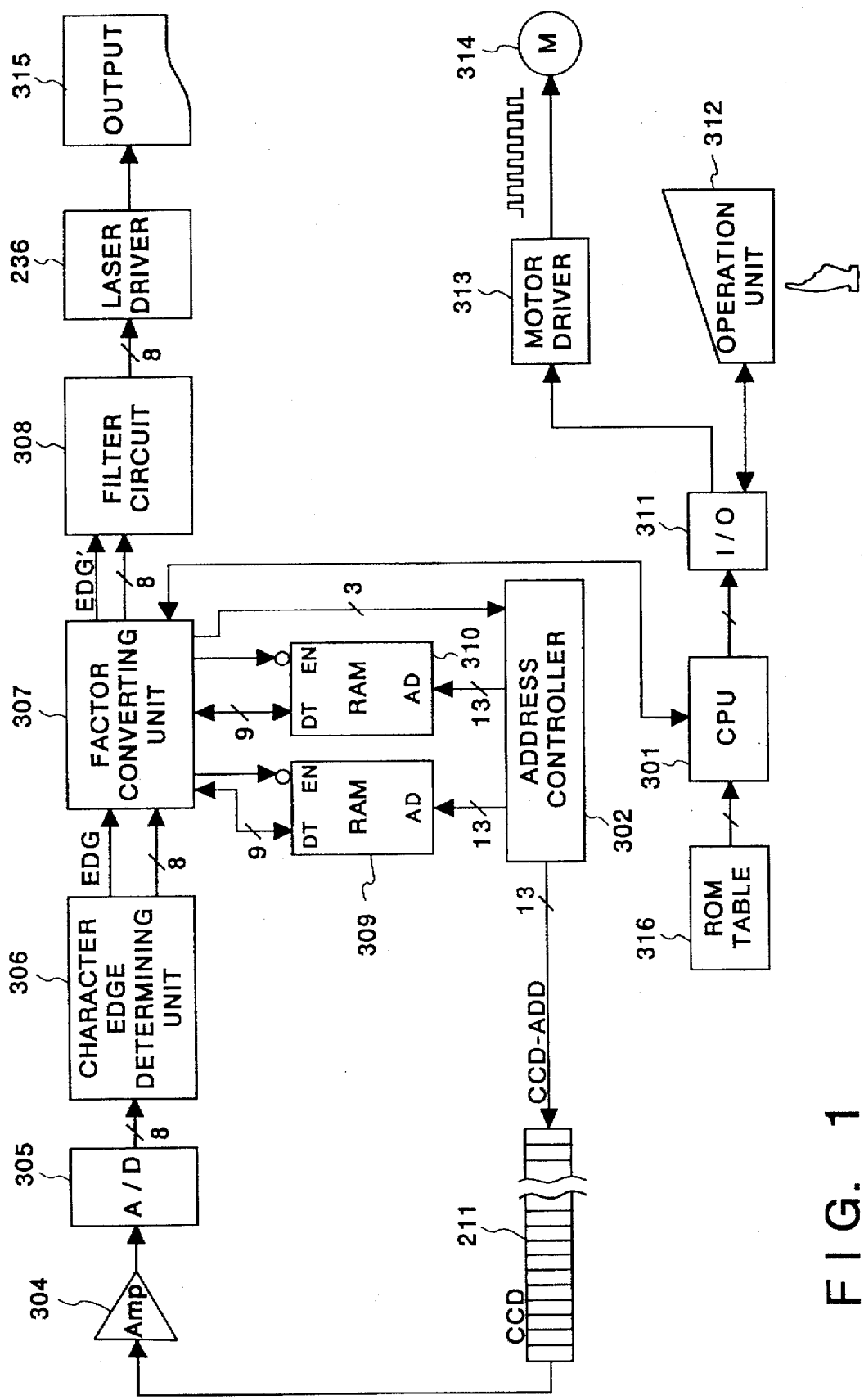
FIG. 1 is a block diagram of a first embodiment of an image processing apparatus according to the present invention.

FIG. 1 is a block diagram of the first embodiment of the image processing apparatus according to the present invention. In FIG. 1, a CPU 301 conducts main control of the entirety of the image processing apparatus. That is, the CPU 301 receives through an I/O controller 311 a factor m % which an operator gives to an operation unit 312, and then calculates the vertical scanning speed V from the factor m % using Equation (1). Thereafter, the CPU 301 controls a motor 314 through the I/O controller 311 and a motor driver 313 and thereby reads a document at the calculated vertical scanning speed V. Also, the CPU 301 reads out the control parameters corresponding to the given factor m % from a ROM table 316, and supplies it to the following horizontal scanning factor conversion processing circuit.

That is, the image signal which is read by a CCD 211 is amplified by an amplifier (Amp) 304, and the amplified signal is converted by an A/D converter (A/D) 305 into a 8-bit digital signal (multi-level image data) whose level ranges from white (=255) to black (=0). A character edge determining unit 306 extracts an edge portion of a character or an image obtained by the line drawing which is represented by the input multi-level image data, and outputs, together with the multi-level image data (8 bits), 1-bit data representing the results of the extraction as EDG data. A factor conversion unit 307 controls an address controller 302. Also, the factor conversion unit 307 conducts the factor conversion process which will be described in detail later by writing a combination of the EDG data and the multi-level image data (9 bits) in and reading that combination from either a RAM 309 or 310 alternately for each line. The factor conversion unit 307 also conducts interpolation on the image data. A filter circuit 308 filters the image data on which the factor conversion process is conducted. The image data is then input to the laser driver 236 where an output image 315 is formed.

Figure 3:
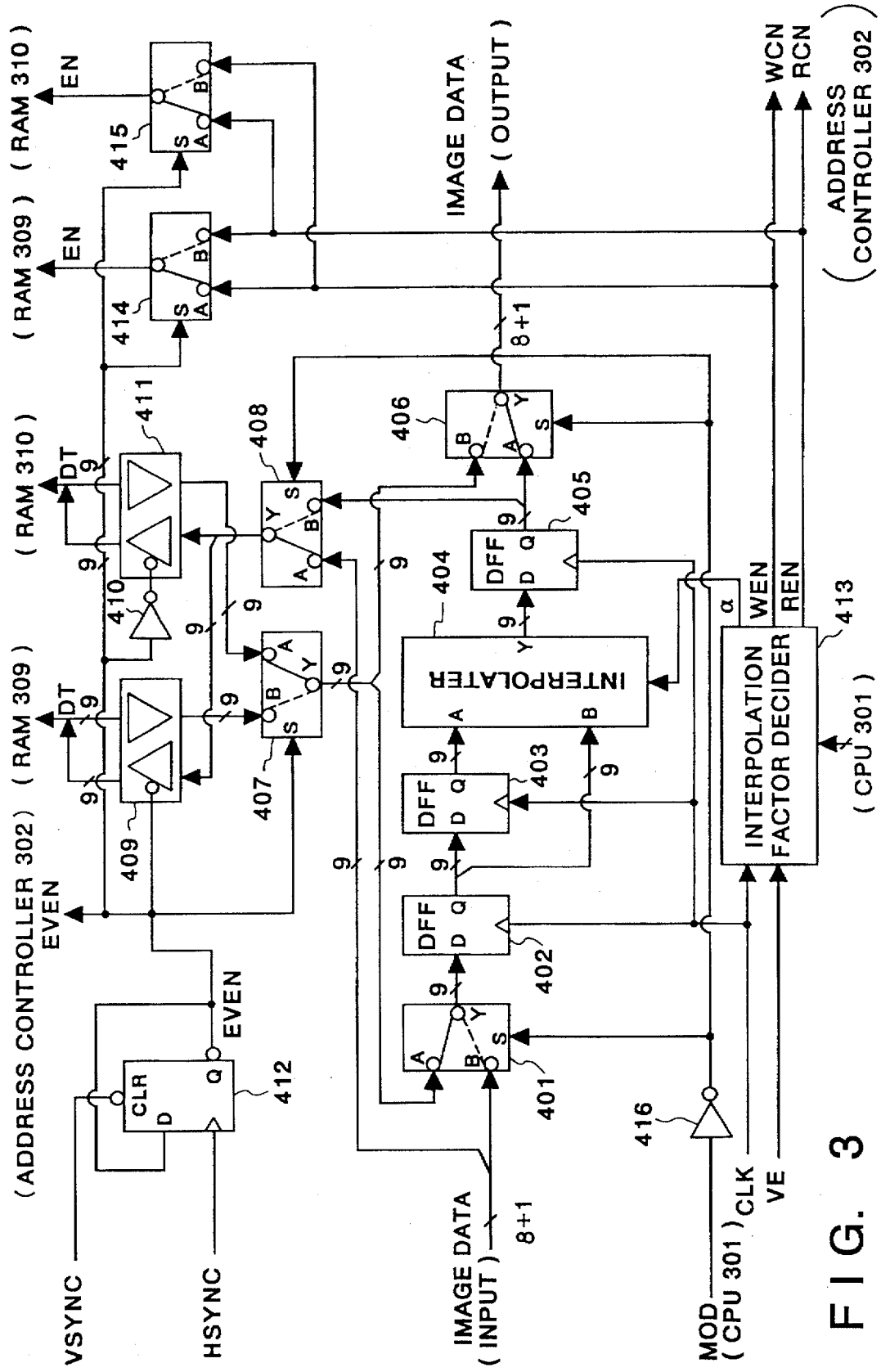
FIG. 3 is a block diagram of a factor converting unit 307 of the image processing apparatus of FIG. 1.

FIG. 3 is a block diagram of the factor conversion unit 307. The factor conversion unit 307 receives from the character edge determining circuit 306 9-bit data which is a combination of the 1-bit EDG data and the 8-bit multi-level image data, and outputs the same 9-bit data.

Figure 12:
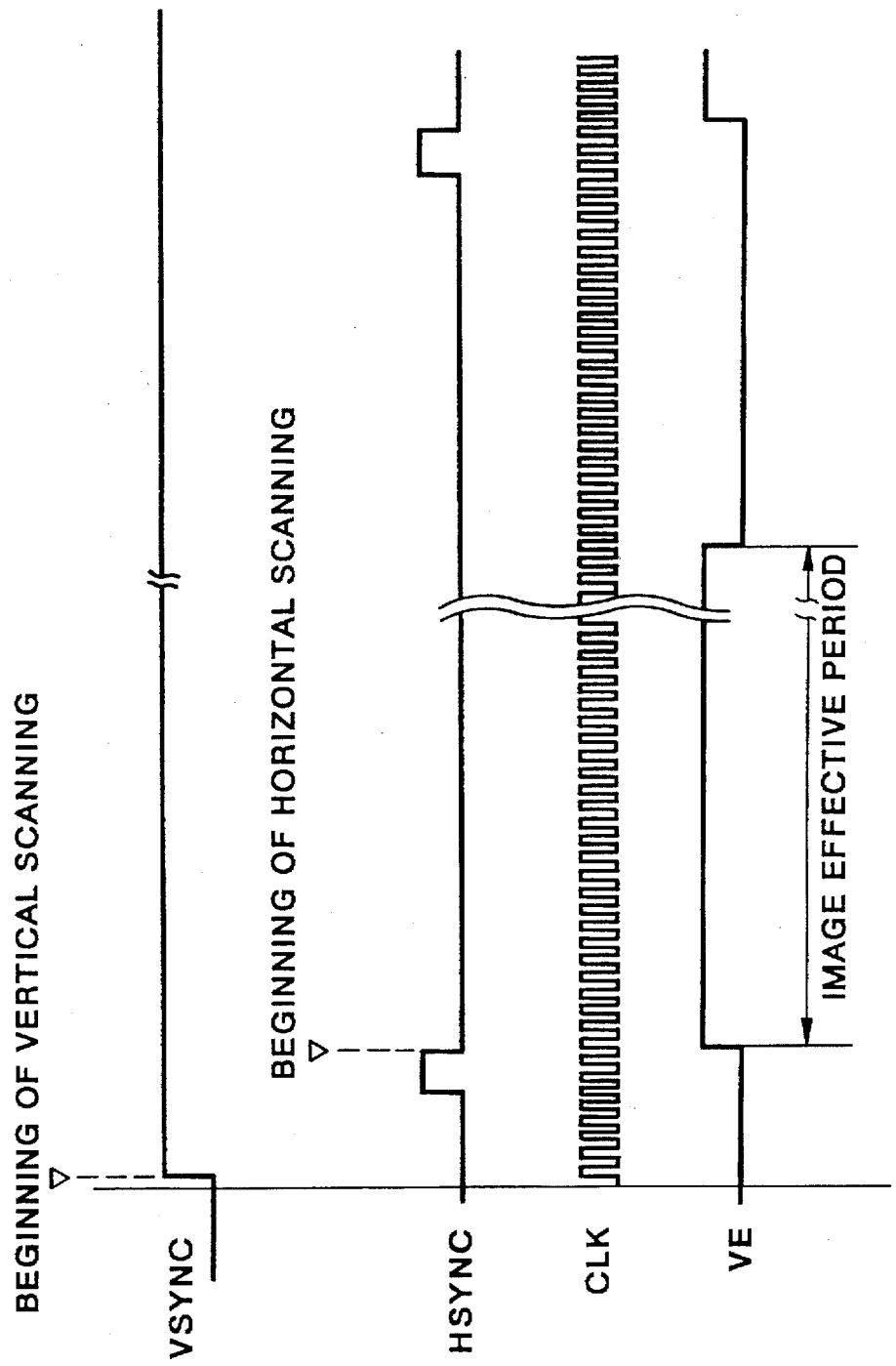
FIG. 12 is a timing chart of basic timing signals.

VSYNC represents a vertical synchronizing signal, HSYNC represents a horizontal synchronizing signal, CLK represents a pixel clock signal, and VE represents a signal which indicates the image effective period in the horizontal direction. FIG. 12 is a timechart of these basic signals.

Selectors 401, 406, 407 and 408 are 9-bit selectors which selectively output a signal input to their respective A terminal when the signal supplied to its input terminal S is at the logical low level, and selectively output a signal input to their respective B terminal when the signal supplied to its input terminal S is at the logical high level. Selectors 414 and 415 are 1-bit selectors which have the same relationship between the logical level of the input terminal S and the selective output. D flip-flops (DFF) 402, 403 and 405 are 9-bit D flip-flops which latch the data input thereto when the CLK signal rises. An interpolater 404 linearly interpolates two consecutive image data (including the EDG data) using an interpolation factor α. An interpolation factor decider 413 generates information on the interpolation factor α(=0 to 15) in accordance with the parameters corresponding to the given factor m % supplied from the CPU 301. The interpolation factor decider 413 also controls updating of the address data (which includes the writing address and reading address) generated by the address controller 302. The factor conversion unit 307 further includes bi-directional buffers 409 and 411, inverters 410 and 416 and a DFF 412 which functions as a 1-bit counter. The bi-directional buffers 409 and 411 control data flow to or from RAM 309 and 310 corresponding to logical level of recieved EVEN signal.

In the thus-arranged factor conversion unit 307, the DFF 412 resets by the VSYNC signal, and outputs a signal whose logical level reverses by the HSYNC signal. That is, when the EVEN signal is at the logical low level, the image which corresponds to an odd line of the document 204 is read from the CCD 211. The read data is written in the RAM 309 without alteration or after interpolation process is performed. At the same time, the image data representing an even line which is read immediately before the document 204 is read from the RAM 310. When the EVEN signal is at the logical high level, the image which represents an even line is read from the CCD 211. The image data read is written in the RAM 310 without alteration or after interpolation process is performed. At the same time, the image data representing the odd line which is stored immediately before that even line is read out from the RAM 309.

A MOD signal is a signal sent from the CPU 301 which assumes the logical high level when the enlargement of the image is designated (m>100) and the logical low level when the reduction in the size of the image is designated or when the image is to be copied in the same size (m≦100).

The image data flows in the manner described below when enlargement of the size of the image is designated.

The image data read by the CCD 211 is output to the bi-directional buffers 409 and 411 through the selector 408. Consequently, if the read image corresponds to the odd line, it is written in the RAM 309 through the bi-directional buffer 409. If the read image corresponds to the even line, it is written in the RAM 310 through the bi-directional buffer 411. The image data is written in the RAM 309 or 310 without alteration.

The image data which is written in the RAM 309 or 310 is enlarged in accordance with the enlarging factor m % and read out through the selector 407. Thereafter, the image data is interpolated by the interpolater 404 and then output from the selector 406.

The image data flows in the manner described below when reduction of the image is designated or the image is to be copied in the same size.

The image data read by the CCD 211 is thinned out in accordance with the reduction factor m % and is interpolated by the interpolater 404 and the resultant data is then written through the selector 408 in the RAM 309 when the data represents an odd line and in the RAM 310 when the data represents an even line. The image data written in the RAM 309 or 310 is read out through the selector 407 and then output through the selector 406.

Figure 4:
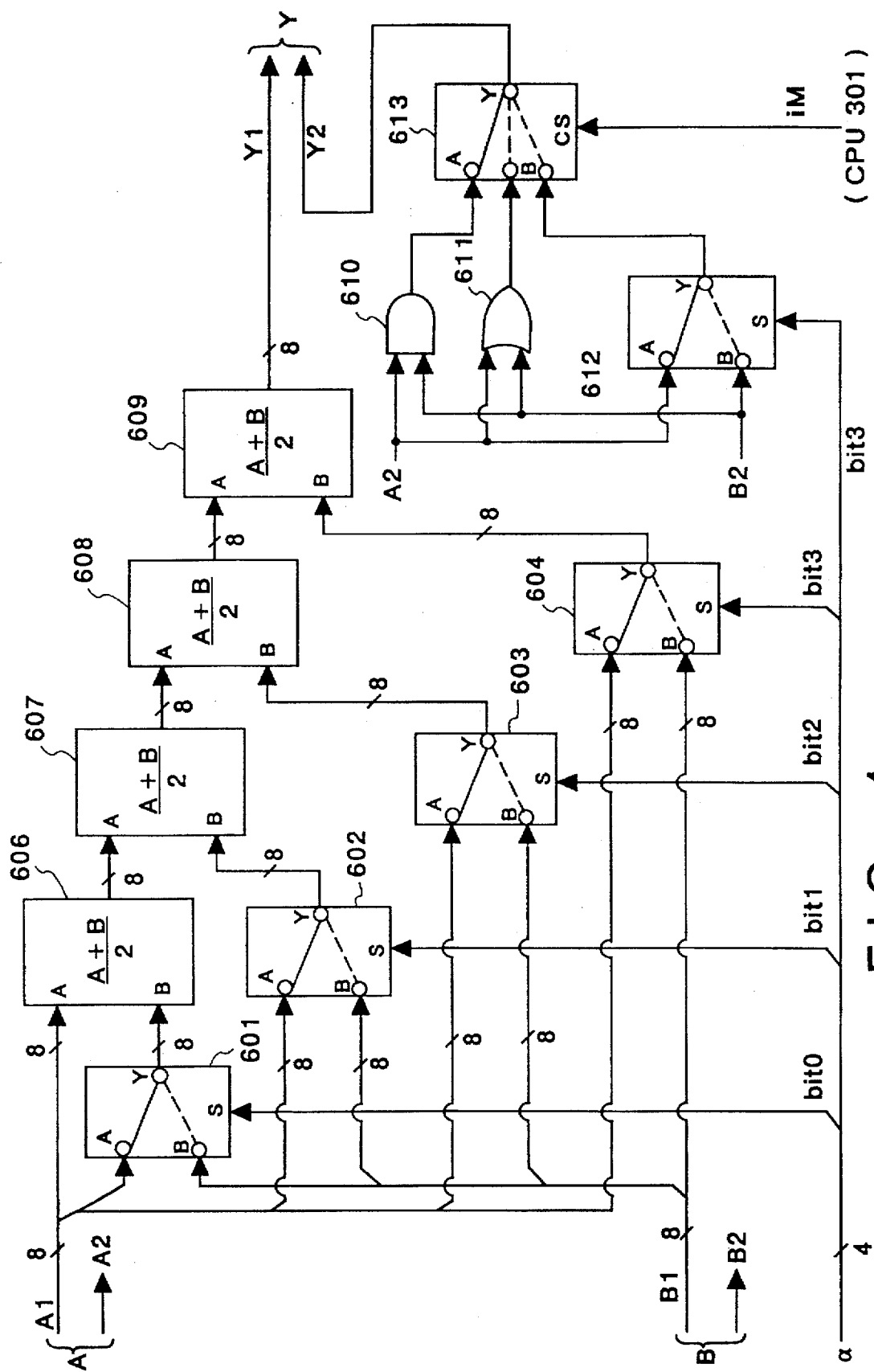
FIG. 4 is a block diagram of an interpolation 404 of the image processing apparatus of FIG. 1.

FIG. 4 is a block diagram of the interpolator 404. In FIG. 4, selectors 601 to 604 are 8-bit selectors which selectively output data supplied to their respective input terminal A when its selection signal input terminal S is at the logical low level and which selectively output data supplied to their respective input terminal B when its selection signal input terminal S is at the logical high level. Adders 606 to 609 each conduct the calculation of (A+B)/2 on 8-bit multi-level image data which is input to the input terminals A and B, and output an 8-bit multi-level image data. The digits following the decimals are omitted.

Reference numeral 610 denotes an AND gate, 611; an OR gate, 612; a 1-bit selector which selectively outputs a bit supplied to its input terminal A when the selection signal input terminal S is at the logical low level and which selectively outputs a bit supplied to its input terminal B when the selection signal input terminal S is at the logical high level, and 613; a 3-input 1-output 1-bit selector which selectively outputs the data supplied to its input terminal C when the selection signal (2 bits) input to its input terminal S is "2" (=10B).

The interpolator 404 receives image data A representing the preceding pixel and image data B representing the present pixel. The image data A consists of 8-bit multi-level image data A1 and 1-bit EDG data A2. Similarly, the image data B consists of 8-bit multi-level image data B1 and 1-bit EDG data B2.

Linear interpolation is conducted on the multi-level image data A1 and B1 by means of the selectors 601 to 604, the adders 606 to 609 and the interpolation factor α(=0 to 15). The resultant interpolated data Y1 is obtained by the following equation $$Y1 = \frac{16-\alpha}{16} A1 + \frac{\alpha}{16} B1 \tag{2}$$

The digits following the decimals are omitted.

The interpolation data Y2 which is based on the EDG data A2 and B2 is either the result of the AND operation conducted on the A2 and B2, the result of the OR operation conducted on the EDG data A2 and B2, or the result of selection of either the A2 or B2 which depends on the uppermost bit (bit 3) of the interpolation factor α. Which results are to be selected is determined by a signal iM which is output from the CPU 301. The CPU 301 sets an iM signal to 0 when factor conversion is to be conducted such that the present EDG data B2=0 is preserved, sets the signal to 1 when factor conversion is to be conducted such that the preceding EDG data A2=1 or the current EDG data B2=1 are preserved, and sets the signal to 2 when factor conversion is to be conducted in the form close to that of the EDG data A2 or B2. That is, the selector 612 selects A2 because interpolation data Y1 which is close to the image data A1 is reproduced when α is small (bit 3=0) according to Equation (2), and selects B2 because interpolation data Y1 which is close to the image data B1 is reproduced when α is large (bit 3=1).

Figure 5:
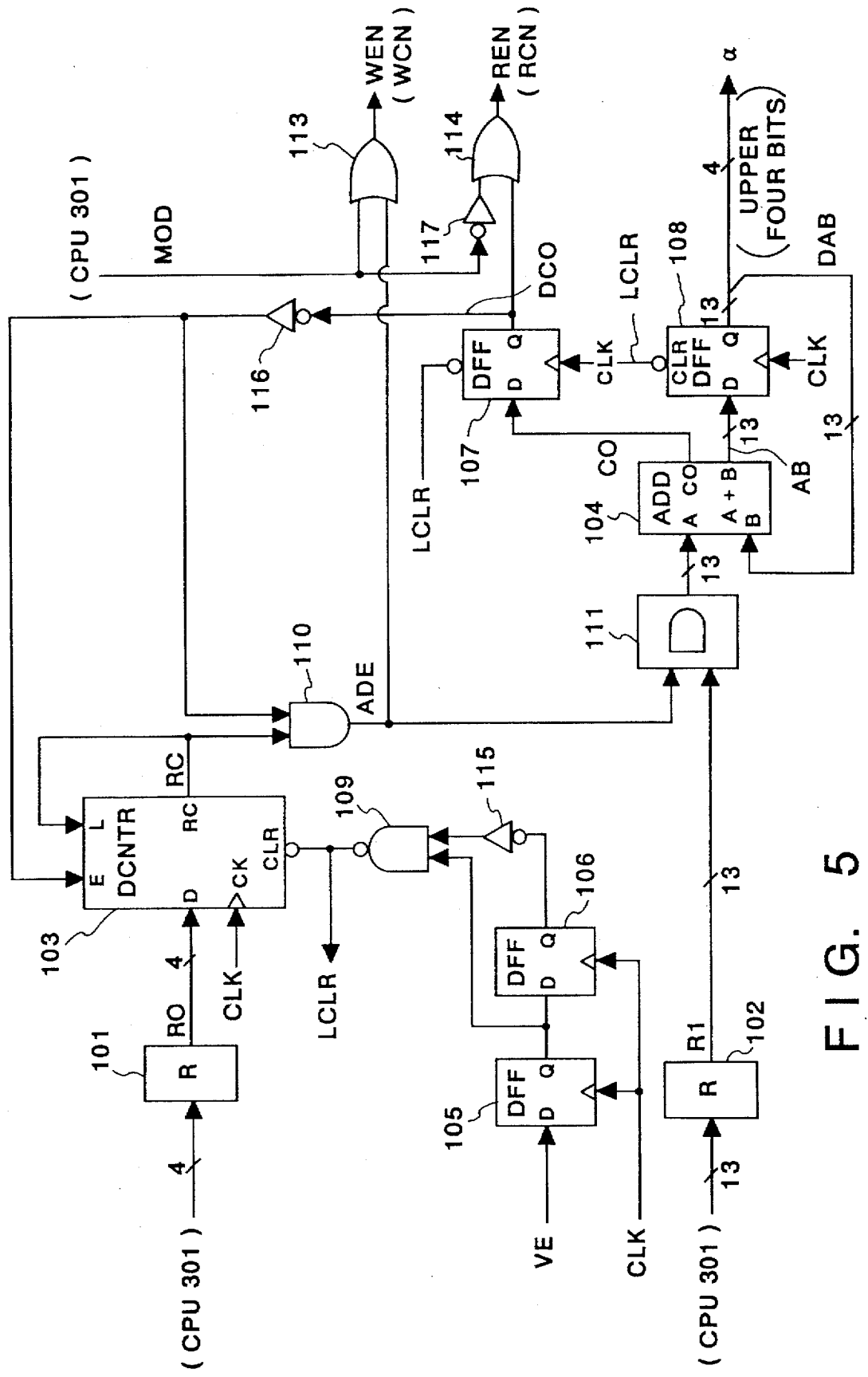
FIG. 5 is a block diagram of an interpolation factor decider 413 of the image processing apparatus of FIG. 1.

FIG. 5 is a block diagram of the interpolation factor decider 413. In FIG. 5, a 4-bit down counter (DCNTR) 103 loads a value R0 supplied to its data input terminal D in synchronism with the CLK signal when its load input terminal L is at the logical high level, and then counts down each time the CLK signal rises while an enable signal E is at the logical high level. When the downcounter counts down to zero, a signal whose logical level is high and which represents that the counting is completed appears at its carry output terminal RC. Since the carrier output terminal RC and the load input terminal L are coupled to each other, as shown in FIG. 5, each time a signal whose logical level is high appears at the carry output terminal RC, the downcounter starts counting down of the subsequent read value. An adder (ADD) 104 calculates the sum (A+B) of 13-bits data supplied to its input terminals A and B, and outputs the results of addition in the form of 13-bit data. A carry out signal (CO) appears at the terminal CO when carrying out occurs on 14th bit (=8192). Reference numerals 105 to 107 denote 1-bit DFFs, 108; a 13-bit DFF, 109; a NAND gate, 110; an AND gate, 111; a 13-bit AND gate, 113 and 114; OR gates, and 115 to 117; inverters.

A reference numeral 101 denotes a 4-bit register (R); and 102; a 13-bit register (R). In each of the registers 101 and 102, a value corresponding to the designated factor m % is set beforehand by the CPU 301.

When the designated factor m % represents the same reduced in size (m≦100), the factor m % and the value R0 set in the register 101 and the value R1 set in the register 102 have the relationship expressed by the following equation:

$$m = \frac{8192}{8192(R0+1)+R1} \times 100 \ (\%) \tag{3}$$

where 0≦R1≦8192.

In Equation (3), the R0 has the function of defining a multiple of "8192" (threshold value). In other words, the R0 has the function of roughly defining the designated factor m %, e.g., 1 to ½, ½ to ⅓, ⅓ to ¼ or the like. This function is implemented in the circuit shown in FIG. 5 by the DCNTR 103, the AND gate 110, the DFF 107 and so on. The R1 has the function of finely adjusting the roughly defined factor.

Thus, when the document is to be copied in the same size or in a reduced size m %, the CPU 301 calculates Equation (3) backwards and sets the values R0 and R1 listed in the following table in the registers R0 and R1.

TABLE

| m [%] | R0 | R1 |
|---|---|---|
| 50 < m ≦ 100 | 0 | $8192 \times \left( \frac{100}{m} - 1 \right)$ |
| 33 < m ≦ 50 | 1 | $8192 \times \left( \frac{100}{m} - 2 \right)$ |
| 25 < m ≦ 33 | 2 | $8192 \times \left( \frac{100}{m} - 3 \right)$ |
| 20 < m ≦ 25 | 3 | $8192 \times \left( \frac{100}{m} - 4 \right)$ |

The above table will be explained in brief. Assuming that a reduction rate m is larger than 33% and is less than 50%, the data R0 assumes "1", which means that the data is basically thinned out every other pixel. However, such a process provides for a reduction rate of 50% but does not accomplish an objective reduction rate. Hence, the obtained reduction rate is corrected by the data R1. In a case where the data R0 is not defined, i.e., where R0=0, the reduction rate can be set within the range of 50%<m≦100%. In other words, when data R0 is 1, 2 or 3, a reduction rate which is equal to or smaller than 50% is attained.

When the designated factor m % represents enlargement in size (m>100), the factor m % and the value R1 set in the register 102 have the relationship expressed by the following equation:

$$m = \frac{8192}{R1} \times 100 \, (\%) \quad (4)$$

More specifically, since R0 is unnecessary, 0 is set in the register 101 so that the value R0 in Equation (3) does not function. Thus, when a document is to be copied at an enlargement rate of m %, the CPU 301 calculates R1 using the following equation (5) and sets the obtained value in the register 102.

$$R1 = \frac{8192}{m} \times 100 \, (\%) \quad (5)$$

FIG. 6 is a block diagram of the address controller 302. In FIG. 6, a 13-bit counter 701 generates a reading address of the CCD 211. That is, the counter 701 is reset while the signal VE is at the logical low level. While the signal VE is at the logical high level, the counter 701 counts each time the CLK signal rises and thereby generates a series of addresses which range between 0 and 8191. A 13-bit counter 702 generates a write address (WR.ADD) of the RAM 309 or 310. That is, the counter 702 counts while the signal VE is at the logical high level and while a signal WCN is at the logical high level. A 13-bit counter 703 generates a read address (RD.ADD) of the RAM 309 or 310. That is, the counter 703 counts while the signal VE is at the logical high level and while a signal RCN is at the logical high level.

Figure 7:
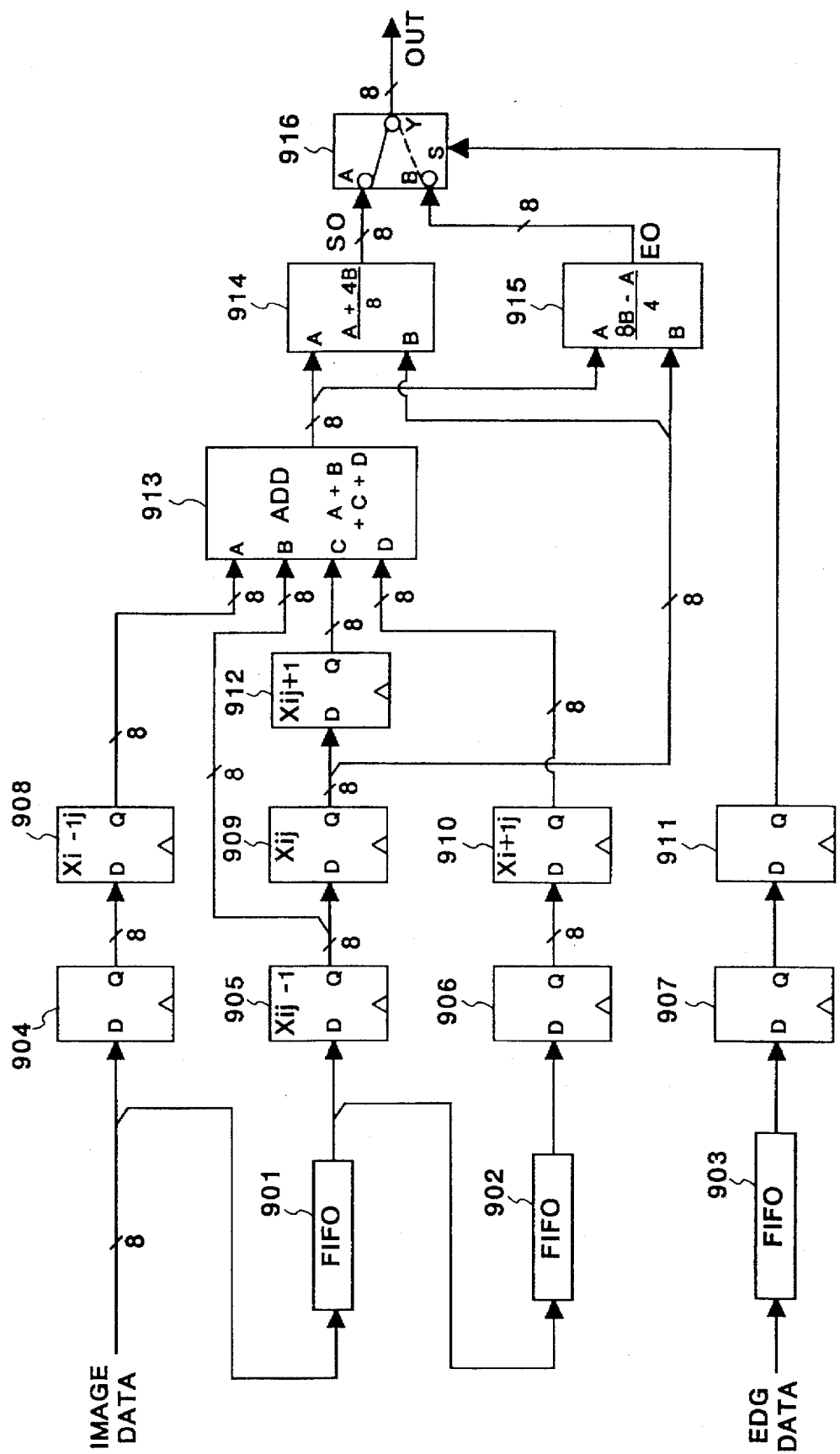
FIG. 7 is a block diagram of a filtering circuit of the image processing apparatus of FIG. 1.

FIG. 7 is a block diagram of the filter circuit 310. In FIG. 7, 8-bit fast-in fast-out memories (FIFO) 901 and 902 delay input multi-level image data by a time corresponding to one line. Since these memories 901 and 902 are connected in series, it is possible to obtain parallel data corresponding to three lines. 8-bit DFFs 904 to 906, 908 to 910 and 912 latch the multi-level image data in synchronism with the CLK signal.

Figure 8:
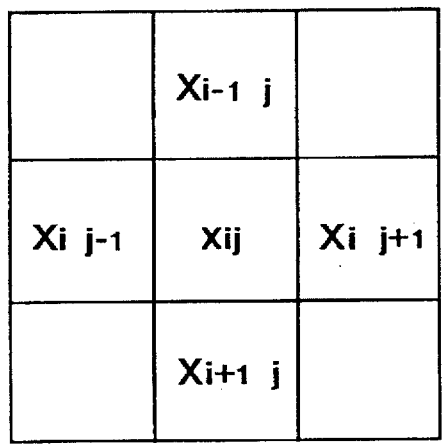
FIG. 8 shows the relation between an objective pixel Xij and surrounding pixels located in a 3×3 window.

As shown in FIG. 8, a window of 3×3 is considered with an objective pixel of Xij. The DFF 908 stores data on the pixel Xi−1,j. Similarly, the DFFs 905, 909, 912 and 910 respectively store data on the pixels Xi, j−1, Xi, j, Xi, J+1 and Xi+1,j.

An adder 913 calculates the sum (A+B+C+D) of four input terminals A to D. A filter operator 914 conducts a smoothing filtering operation expressed by (A+4B)/8 on the data supplied to its two input terminals A and B. This operation is expressed using the pixel data in the above-described window as follows, and the smoothing operation output SO of the objective pixel Xij is thus obtained as follows:

$$SO = \frac{4X_{ij} + X_{i-1,j} + X_{i+1,j} + X_{ij-1} + X_{ij+1}}{8} \quad (6)$$

A filter operator 915 conducts an edge emphasis filtering operation expressed by (8B−A)/4 on the data supplied to its two input terminals A and B. This operation is expressed using the pixel data in the above-described window as follows, and the edge emphasis operation output E0 of the objective pixel Xij is thus obtained as follows:

$$E0 = \frac{8X_{ij} - X_{i-1,j} - X_{i+1,j} - X_{ij-1} - X_{ij+1}}{4} \quad (7)$$

A 1-bit FIFO 903 delays EDG data input thereto by a time corresponding to one line. 1-bit DFFs 907 and 911 synchronize the EDG data with the objective pixel Xij of the multi-level image data. If EDG data=0, the multi-level image data is not an edge portion, and a selector 916 thus selects the data supplied to its input terminal A which is the smoothing operation output SO. If EDG data=1, the multi-level image data comprises an edge portion, and the selector 916 thus selects the data supplied to its input terminal B and outputs the edge emphasis operation output E0.

<Operation conducted when the factor m % represents the same or reduced size>

Figure 9:
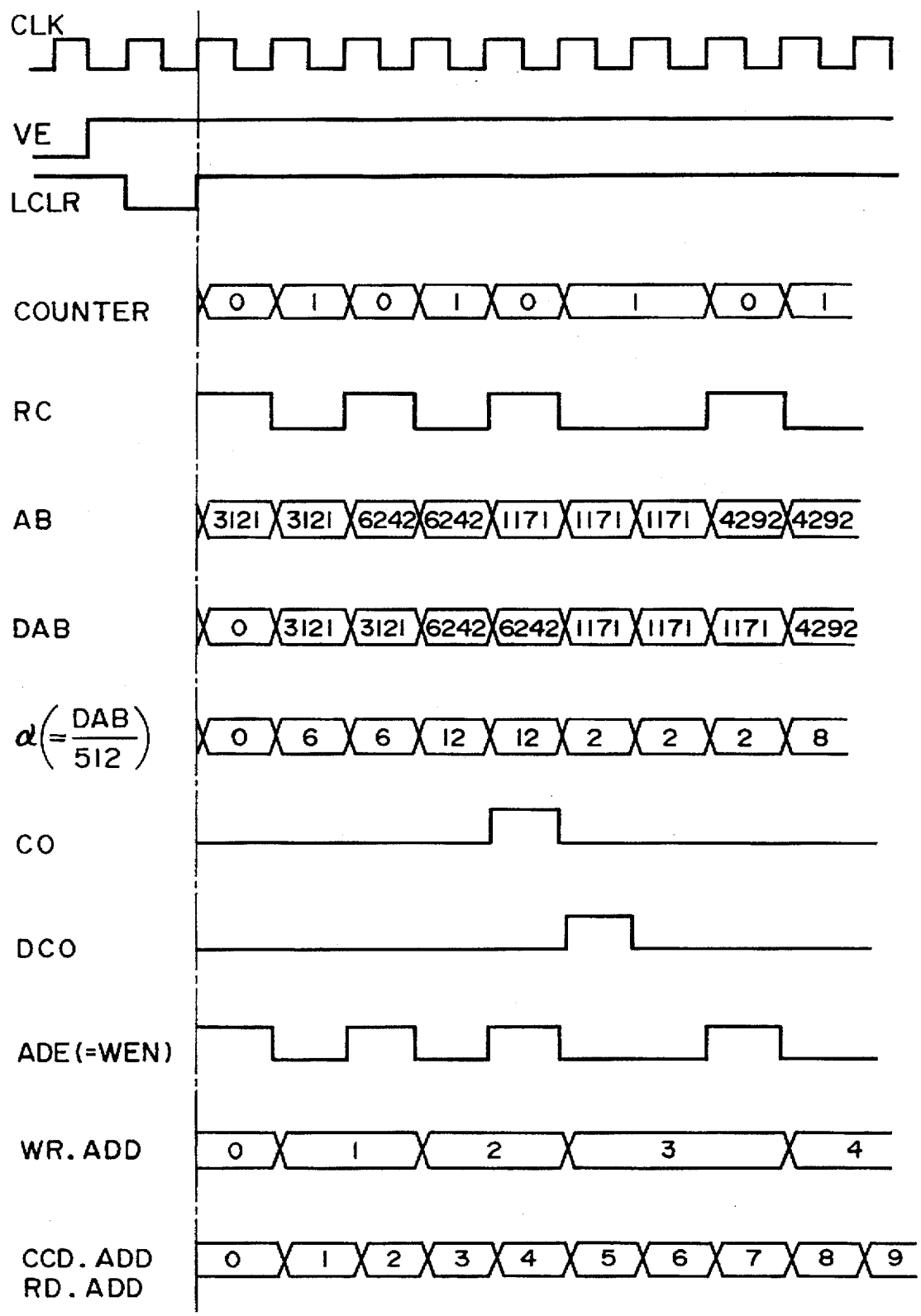
FIG. 9 is a timing chart of the operation conducted when a designated rate m % represents the same size or reduced size.

FIG. 9 is a timing chart of the operation conducted when the designated factor m % represents the same or reduced size.

<Writing operation>

This writing operation is an operation in which the image data read by the CCD 211 is thinned out and interpolated in accordance with the factor m % and in which the interpolated data is written in the RAM 309 or 310.

Since m≦100, MOD=0. Assuming that the designated factor is 42%, 1 is set to R0 and 3121 is set to R1, as shown in Table 1.

First, when the signal VE rises, a LCLR signal is generated, and the output DCO of the DFF 107 and the output DAB of the DFF 108 fall (see FIG. 5).

At a subsequent CLK signal, 0 is set to the DCNTR (1 is set to RC). This raises the output signal ADE of the AND gate 110 and, hence, the signal WEN, and thereby enables writing of the image data and increment of the writing address WR.ADD. The adder 104 outputs an output value AB of "3121", which is no more than "8192 (threshold value)" and which makes the signal CO assume the logical low level. Also, since the data DAB is "0", the interpolation factor α is "0". In consequence, the interpolater 404 outputs the value A1 as the output value Y1, and this value A1 is written in the RAM 309 or 310.

At a subsequent CLK signal, the writing address WR.ADD assumes "1". Also, 1 is set to the DCNTR (0 is set to RC). This makes the output ADE of the AND gate 110 and, hence, the writing enable signal WEN fall, and disables writing of the image data and increment of the writing address WR.ADD. The output data DAB of the DFF 108 assumes "3121", and the output data AB assumes "3121", which is no more than "8192" and which makes the signal CO assume the logical low level. Also, since the data DAB assumes "3121", the interpolation factor α is the value of upper four bits of the DAB assumes "6" (=3121/2⁹).

At a subsequent CLK signal, the writing address WR.ADD remains "1". Also, 0 is set to the DCNTR (1 is set to RC). This raises the signal ADE and, hence, the signal WEN, and thereby enables writing of the image data and increment of the writing address WR.ADD. Also, the output AB of the adder 104 assumes "6242", which is no more than "8192" and which makes the signal CO assume the logical low level. Also, since α=6 (only bit 1 and 2 assume the logical high level), the interpolater 404 shown in FIG. 4 outputs the value Y1 obtained by the following equation on the basis of the image data A1 at the CCD reading address CCD.ADD "1" and the image data B1 at CCD.ADD "2".

$$Y1=\{10 \times A1 + 6731\}/16$$

The data interpolated at the above rate is written in the RAM 309 or 310.

At a CLK signal which is two pulses later than the previous one, 0 is set to the DCNTR (1 is set to RC). This raises the signal ADE and, hence, the signal WEN, and thereby enables writing of the image data and increment of the writing address WR.ADD. Also, AB assumes "1171", which exceeds the value 8192 and which thus makes the signal CO assume the logical high level. Also, since α=12 (DAB=6242), Y1 is calculated by the following equation on the basis of the image data A1 at the CCD reading address CCD.ADD "3" and the image data B1 at the CCD.ADD "4".

$$Y1=\{4\times A1+12731\}/16$$

The data Y1 interpolated at the above rate is written in the RAM 309 or 310.

At a subsequent CLK signal, the writing address WR.ADD assumes "3". Also, 1 is set to the DCNTR (0 is set to RC). This makes the signal ADE and, hence the signal WEN fall, and thereby disables writing of the image data and increment of the writing data WR.ADD. Also, since the signal CO is at the logical high level, the DFF 107 outputs the signal DCO whose logical level is high.

At a subsequent CLK signal, since the signal DCO has been at the logical high level, the enable terminal E of the down counter DCNTR 103 assumes the logical low level and this prevents the down counter from counting down. That is, the DCNTR retains 1 (RC retains 0). This makes the signal ADE and, hence, the signal WEN fall, and thereby disables writing of the image data and incrementing of the writing address WR.ADD. Also, the AB assumes 1171, which is no more than 8192, so the signal CO assumes the logical low level.

Thus, each time the signal DCO assumes the logical high level, increment of the writing address WR.ADD is suspended for one pixel, and the fine reduction in either of the above ranges, including 1 to ½, ½ to ⅓ and ⅓ to ¼, is adequately conducted.

As will be clear from the foregoing description, the writing address WR.ADD proceeds at a rate which corresponds to the parameters R0 and R1, and image data Y1 representing an adequate density is formed and written in the RAM 309 or 310 when the image data is to be written. The ratio of the proceeding of the writing address WR.ADD to the proceeding of the reading address CCD.ADD is 3/7 (approximately 42%).

<Reading-out operation>

In this reading-out operation, the image data which is interpolated and thinned out in accordance with the aforementioned factor m % and written in the RAM 309 or 310 is read out in sequence to a printer.

Since m≦100, MOD=0. In consequence, the reading enable signal REN is at the logical high level, and the reading address RD.ADD increases in a simple fashion each time the CLK signal rises, like the CCD.ADD. The image data which is read out is output through the selector 406 shown in FIG. 3.

In the case where the designated factor m % represents reduction in the size, lack of the EDG data is possible. Therefore, 1 is set to iM in order to select the results of the OR operation.

<Operation conducted when the factor m % represents enlargement>

Figure 10:
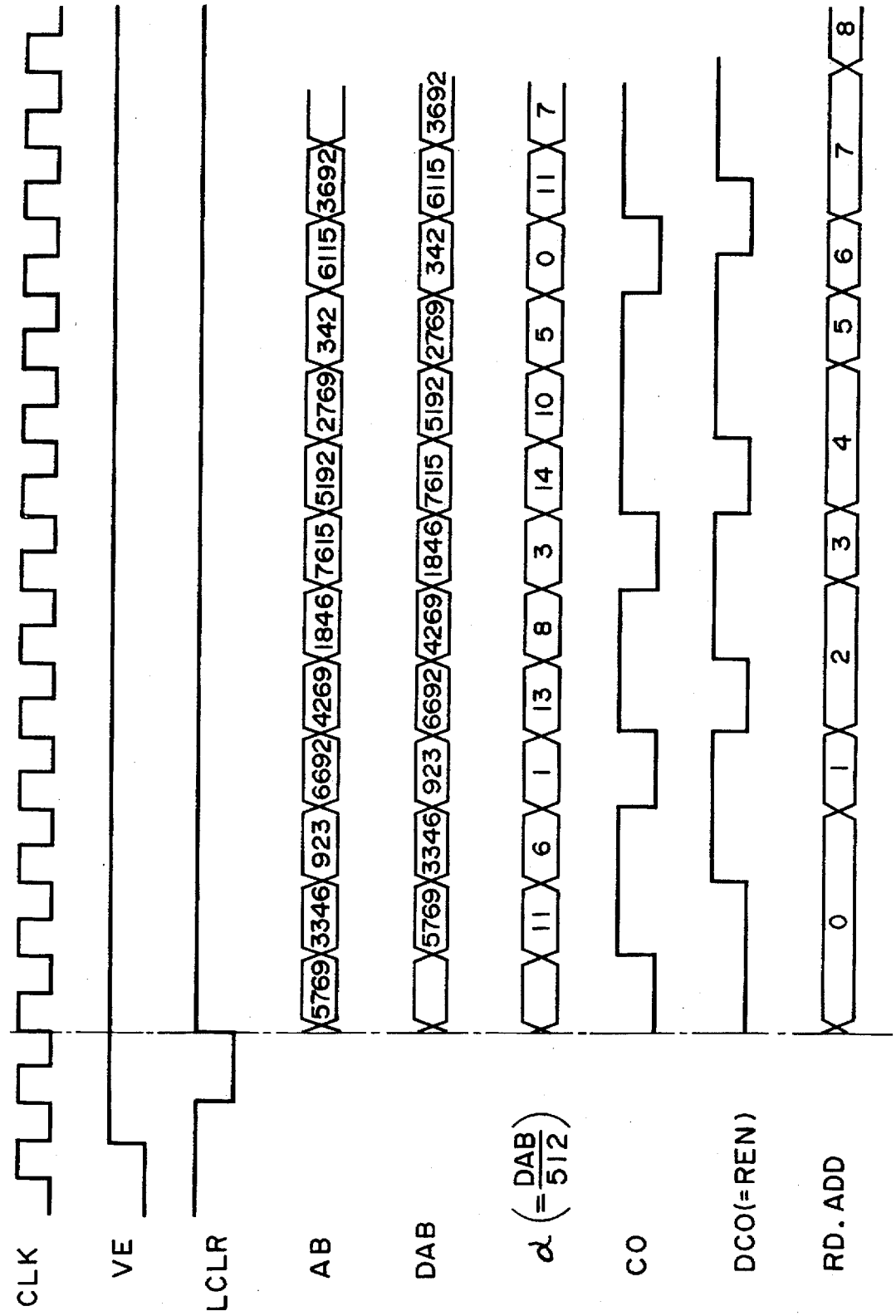
FIG. 10 is a timing chart of the operation conducted when a designated rate m % represents enlargement in size.

FIG. 10 is a timing chart of the operation conducted when the designated factor m % represents enlargement.

<Writing operation>

In this writing operation, the image data read by the CCD 211 is written in sequence in the RAM 309 or 310 without alteration.

In the case of enlargement, since m>100, MOD=1. In consequence, the writing enable signal WEN is at the logical high level. That is, the writing address WR.ADD increases in a simple fashion each time the CLK signal rises, like the CCD.ADD, and the image data sent from the CCD 211 is thus written in sequence alternately in the RAM 309 or 310 through the selector 408 shown in FIG. 3.

<Reading-out operation>

In this reading-out operation, the image data written in the RAM 309 or 310 without alteration is read out in sequence, and that image data is interpolated and then output to the printer.

In the case of enlargement, since m>100, MOD=1. Assuming that the designated factor=142%, R0=1, and R1=5769. That is, "0" is set in the register 101, and "5769" is set in the register 102. Also, since R0=0, DCNTR=0 (RC=1).

First, when the signal VE rises, an LCLR signal is generated, and DCO and DAB assume the logical low level.

At a subsequent CLK signal, the signal ADE assumes the logical high level, making the output AB of the adder 104 assume "5769", which is no more than "8192", and making the signal CO fall. Also, the signal REN is at the logical low level, and this makes the reading address RD.ADD assume "0". In consequence, the image data located at address "0" in the RAM 309 or 310 is read out.

At a subsequent CLK signal, the data DAB assumes "5769", and the data AB thus assumes "3346", which exceeds "8192". In consequence, the signal CO assumes the logical high level. Also, since the interpolation factor α which is the upper four bits of the DAB is "11", the interpolated data Y1 is calculated by the following equation on the basis of the image data A1 at the reading address RD.ADD "0" and the image data B1 at the RD.ADD "1".

$$Y1=\{5\times A1+11\times B1\}/16$$

The data Y1 interpolated at the above rate is output from the selector 406.

At a subsequent CLK signal, the data DAB assumes "3346" and the data AB thus assumes "923", which exceeds "8192" again. In consequence, the signal CO assumes the logical high level. Also, since α=6, the interpolated data Y1 is calculated by the following equation on the basis of the image data A1 at the reading address RD.ADD "0" and the image data B1 at the RD.ADD "1".

$$Y1=\{10\times A1+6\times B1\}/16$$

The data Y1 interpolated at the above rate is output from the selector 406. At this time, the signal DCO assumes the logical high level, and the signal REN assumes the logical high level. That is, increment of the reading address RD.ADD is enabled.

At a subsequent CLK signal, the reading address RD.ADD assumes "1". Also, since the data DAB holds "923", the data AB assumes "6692", which is no more than "8192". In consequence, the signal CO assumes the logical low level. Also, since α=1, the interpolated data Y1 is calculated by the following equation on the basis of the image data A1 at the reading address RD.ADD "0" and the image data B1 at the reading address RD.ADD "1".

$$Y1=\{15\times A1+1\times B1\}/16$$

The data Y1 interpolated at the above rate is output from the selector 406. At this time, the signal DCO is at the logical high level, and the signal REN is thus at the logical high level. That is, increment of the reading address RD.ADD is enabled.

Thus, the reading address RD.ADD proceeds at a rate corresponding to the value R1 set in the register 102, and the image data Y1 representing an adequate density is thus interpolated and output from the selector 406 when the image data is to be output. The rate of the proceeding of the reading address RD.ADD relative to that of the CCD.ADD is approximately 142.

In the case where the designated factor m % represents enlargement, 2 is set to iM shown in FIG. 4 in order to preserve the form of an original image by means of the EDG data.

Figure 11:
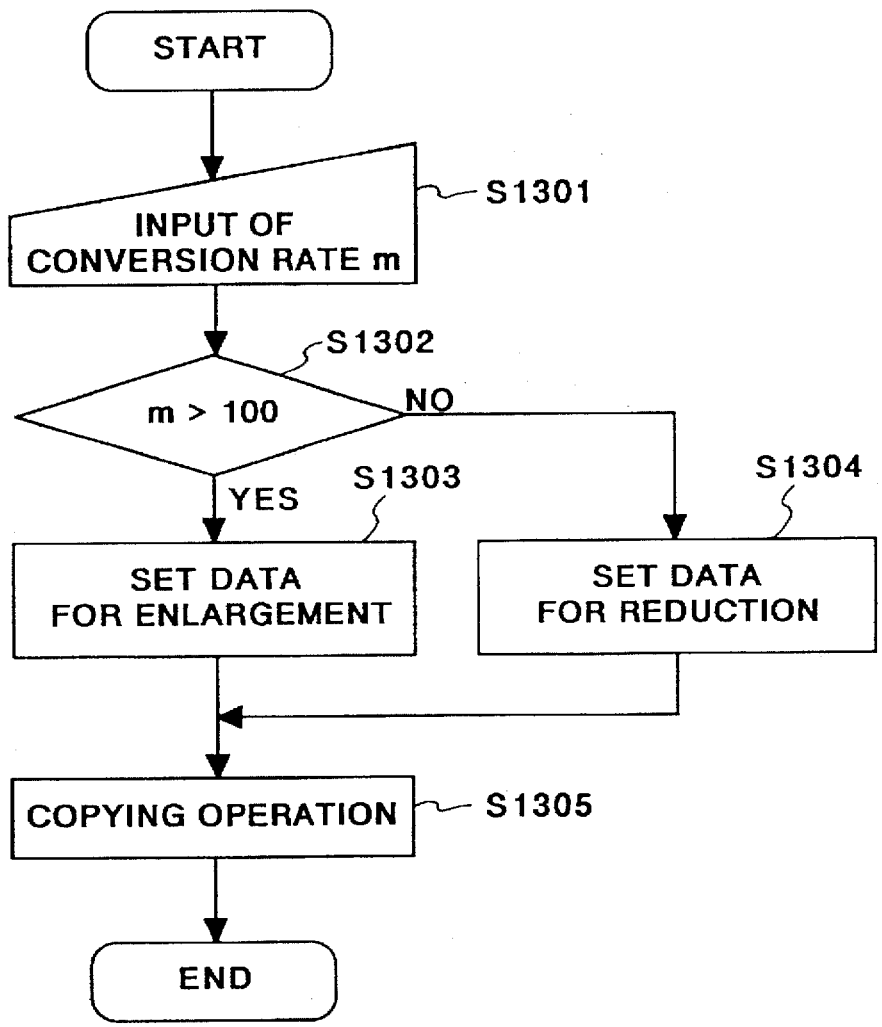
FIG. 11 is a flowchart of the main control conducted in the first embodiment of the present invention.

FIG. 11 is a flowchart of the main control. In FIG. 11, a factor m % is input from the operation unit in step S1301. Thereafter, in step S1302, m is compared with 100, and a determination is made as to whether m represents the same size, enlarged one or reduced one. If it is determined that m represents enlarged size, data required for enlargement (V, MOD, R0, R1 and so on) is set in step S1303. If it is determined that m represents reduced or the same size, data required for reduced or the same size is set in step S1304. Thereafter, copying operation is conducted in step S1305.

In this embodiment, linear interpolation is employed. However, the present invention is not limited to this but sinc interpolation may also be used.

FIG. 14 is a block diagram of a sinc interpolater, showing a second embodiment of the present invention. In FIG. 14, 8-bit DFFs 1401 to 1404 delay image data by a time corresponding to one pixel. 4-bit DFFs 1405 and 1406 delay the interpolation factor α (which may be the same one as employed in the above-described first embodiment) by a time corresponding to one pixel. Look-up tables (LUT) 1407 to respectively store the values obtained by the following equations (8) to (11).

$$\begin{rcases} a_{-2} = b_{-2} \times \gamma \\ a_{-1} = b_{-1} \times \gamma \\ a_0 = b_0 \times \gamma \\ a_1 = b_1 \times \gamma \end{rcases} \quad (8)$$

where $$\begin{rcases} b_{-2} = \text{sinc}\left\{ \left(\frac{\alpha}{16} - 2\right) \times \frac{\pi}{4} \right\} \\ b_{-1} = \text{sinc}\left\{ \left(\frac{\alpha}{16} - 1\right) \times \frac{\pi}{4} \right\} \\ b_0 = \text{sinc}\left\{ \left(\frac{\alpha}{16} \times \frac{\pi}{4}\right) \right\} \\ b_1 = \text{sinc}\left\{ \left(\frac{\alpha}{16} + 1\right) \times \frac{\pi}{4} \right\} \end{rcases} \quad (9)$$

$$\gamma = \frac{1}{b_{-2} + b_{-1} + b0 + b1} \quad (10)$$

$$\text{sinc}(x) = \frac{\sin x}{x} \quad (11)$$

Reference numerals 1411 to 1414 denote multipliers, and a reference numeral 1415 denotes an adder. Where Xt+1, Xt, Xt−1 and Xt−2 are respectively the output of the DFFs 1401 to 1404, the interpolated output Yt is obtained by the following equation (12).

$$yt = a_{-2} \times Xt-2 + a_{-1} \times Xt-1 + a0 \times Xt + a1 \times Xt+1 \quad (12)$$

In this embodiment, the output of the interpolater 404 is thinned out in accordance with the reduction rate of m %. However, the input of the interpolater 404 may also be thinned out in accordance with the reduction rate of m %.

In the aforementioned embodiments, data in the horizontal direction is interpolated and thinned out. However, if the present apparatus has a memory capacity capable of storing image data (multi-level data) of one page, the enlargement or reduction in vertical direction can be performed in the same manner of above-described process for the horizontal direction.

As will be understood from the foregoing description, deterioration in the image quality does not occur when an original image is copied at an enlarged or reduced rate or in the same size.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting image data in synchronism with a predetermined clock;

designation means for designating a reduction ratio of an image represented by said image data input by said input means;

generating means for generating a first value and a second value in accordance with the reduction ratio designated by said designation means, the first value indicating a basic interval of thinning out, the second value being used for adjusting the interval of thinning out;

storage means for storing image data;

counting means for counting said predetermined clock until a count value of said counting means corresponds to the first value and then outputting a signal;

addition means for cumulatively adding the second value whenever said counting means outputs the signal and holding a predetermined number of lower digits of the value added by said addition means;

deactivating means for deactivating said counting means so as to stop counting by said counting means when the value added by said addition means exceeds a predetermined value;

interpolation means for interpolating data of neighboring pixels of the image data inputted by said input means in accordance with the value added by said addition means and generating interpolated pixel data;

thinning out means for generating a write address in synchronism with the signal outputted by said counting means and for storing the interpolated pixel data into said storage means in accordance with the generated write address, said thinning out means being performed substantially concurrently with said interpolation means; and outputting means for outputting image data stored in said storage means as reduced image data.

2. An image processing apparatus according to claim 1, wherein said interpolating means generates the interpolated pixel data on the basis of a weight represented by the value added by said addition means between a pixel and a neighboring pixel.

3. An image processing apparatus comprising:

input means for inputting image data in synchronism with a predetermined clock;

designation means for designating an enlargement ratio or a reduction ratio of an image represented by the image data input by said input means;

generating means for generating a first value and a second value in accordance with the enlargement ratio or the reduction ratio designated by said designation means;

storage means for storing image data;

counting means for counting clock intervals of said predetermined clock until a count value of said counting means corresponds to the first value and then outputting a signal;

addition means for cumulatively adding the second value whenever said counting means outputs the signal and holding a predetermined number of lower digits of the value added by said addition means;

determination means for determining whether or not the value added by said addition means exceeds a predetermined value;

deactivating means for deactivating said counting means so as to stop counting by said counting means when said determination means determines that the value added by said addition means exceeds the predetermined value;

interpolation means for interpolating data of neighboring pixels of the image data inputted by said input means in accordance with the value added by said addition means and generating interpolated pixel data;

thinning out means for generating a write address in synchronism with the signal outputted by said counting means and for storing the interpolated pixel data into said storage means in accordance with the generated write address, said thinning out means being performed substantially concurrently with said interpolation means; and enlarging/reducing control means for controlling said apparatus such that (i) when said designation means designates an enlargement ratio, the input image data is stored in said storage means, the first value is set so that said counting means outputs the signal at each clock interval of said predetermined clock, the second value dictates update timing of a read-out address of said storage means, the stored image data is read out according to the read-out address which is updated when said determination means determines that the value added by said addition means exceeds the predetermined value, said interpolation means interpolates the read-out image data, and the interpolated image data is outputted as enlarged image data, and (ii) when said designation means designates a reduction ratio, the first value indicates a basic interval of thinning out and the second value is used for adjusting the interval of thinning out, the image data input by said input means is interpolated by said interpolation means and thinned out by said thinning out means, the interpolated and thinned-out image data is stored in said storage means according to a write address which is updated when said counting means outputs the signal, and the stored image data is outputted as reduced image data.

4. The apparatus according to claim 1, wherein said input means inputs multi-value image data.

5. The apparatus according to claim 3, wherein said input means inputs multi-value image data.

6. An image processing method including the steps of:

inputting image data in synchronism with a predetermined clock;

designating a reduction ratio of an image represented by the input image data;

generating a first value and a second value in accordance with the designated reduction ratio, the first value indicating a basic interval of thinning out, the second value being used for adjusting the interval of thinning out;

counting said predetermined clock until a count value corresponds to the first value and then outputting a signal;

cumulatively adding the second value whenever said counting step outputs the signal and holding a predetermined number of lower digits of the value added by said adding step;

deactivating said counting step so as to stop counting when the value added by said adding step exceeds a predetermined value;

interpolating data of neighboring pixels of the inputted image data in accordance with the value added by said adding step and generating interpolated pixel data;

generating a write address in synchronism with the signal outputted by said counting step, for storing the interpolated pixel data into predetermined storage means in accordance with the generated write address, said thinning out step being performed substantially concurrently with said interpolating step; and outputting the image data stored in said storage means as reduced image data.

7. An image processing method according to claim 6, wherein the input data are multi-value image data.

8. An image processing method including the steps of:

inputting image data in synchronism with a predetermined clock;

designating an enlargement ratio or a reduction ratio of an image represented by the input image data;

generating a first value and a second value in accordance with the enlargement ratio or the reduction ratio;

counting clock intervals of said predetermined clock until a count value corresponds to the first value and then outputting a signal;

cumulatively adding the second value whenever the signal is output in said counting step and holding a predetermined number of lower digits of the value added;

determining whether or not the value added in said adding step exceeds a predetermined value;

deactivating said counting step so as to stop counting in said counting step when the value added in said adding step is determined to exceed the predetermined value;

interpolating data of neighboring pixels of the inputted image data in accordance with the value added in said adding step and generating interpolated pixel data;

generating a write address in synchronism with the signal outputted in said counting step and storing the interpolated pixel data in storage means in accordance with the generated write address, said thinning out step being performed substantially concurrently with said interpolating step; and (i) when an enlargement ratio is designated, storing the input image data in the storage means after the step in which the first value and the second value are generated, in which the first value is set so that the signal is output in said counting step at each clock interval of said predetermined clock and the second value is set to dictate update timing of a read-out address of the storage means, reading out stored image data according to the read-out address which is updated when it is determined that the value added in said adding step exceeds the predetermined value, wherein the read-out image data is interpolated in said interpolating step, and outputting the interpolated image data as enlarged image data, or (ii) when a reduction ratio is designated, the first value having been set to indicate a basic interval of thinning out and the second value having been set for adjusting the interval of thinning out, after the input image data is interpolated in said interpolating step, thinning out the interpolated image data, storing the interpolated and thinned out image data in the storage means according to a write address which is updated when the signal is output in said counting step, and outputting the stored image data as reduced image data.

9. An image processing method according to claim 8, wherein the input data are multi-value image data.

10. An image processing apparatus comprising:
- input means for inputting image data in synchronism with a predetermined clock;
- designation means for designating a reduction ratio of an image represented by the image data input by said input means;
- setting means for setting a first value and a second value, the first value relating inversely to the reduction ratio designated by said designation means, the second value being for adjusting the first value;
- addition means for cumulatively adding the second value in accordance with the first value and said predetermined clock and holding a predetermined number of lower significant digits of the added value;
- storage means for storing the image data;
- interpolation means for interpolating the image data inputted by said input means in accordance with the value held by said addition means;
- thinning out means for thinning out the image data interpolated by said interpolation means, in accordance with the first value and whether or not the value added by said addition means exceeds a predetermined value, and storing the thinned-out image data into said storage means, said thinning out means being performed substantially concurrently with said interpolating means; and
- output means for outputting the image data stored in said storage means as a reduced image data.

11. An image processing method including the steps of:
- inputting image data in synchronism with a predetermined clock;
- designating a reduction ratio of an image represented by the input image data;
- setting a first value and a second value, the first value being inversely related to the reduction ratio, the second value being for adjusting the first value;
- cumulatively adding the second value in accordance with the first value and said predetermined clock and holding a predetermined number of lower significant digits of the added value;
- interpolating the input image data in accordance with the value held in said adding step;
- thinning out the interpolated image data in accordance with the first value and whether or not the value added in said adding step exceeds a predetermined value, and storing the thinned out image data into storage means, said thinning out step being performed substantially concurrently with said interpolating step; and
- outputting image data stored in said storage means as a reduced image data.

* * * * *

UNITED STATES PATENT AND TRADEMARK OFFICE
CERTIFICATE OF CORRECTION

PATENT NO. : 5,729,357
DATED : March 17, 1998
INVENTOR(S) : Funada et al.

It is certified that error appears in the above-identified patent and that said Letters Patent is hereby corrected as shown below:

Column 2

Line 44, "V0," should read --$V_0$--.

Column 5

Line 13, "10" should be deleted.
Line 20, "(=10B)." should read --$(=10_B)$.--.

Column 8

Line 54, "Y1={10xA1 + 6731}/16" should read --Y1={10xA1 + 6xB1}/16--.

Column 9

Line 2, "Y1={4xA1 + 12731}/16" should read --Y1={4xA1 + 12xB1}/16--.

UNITED STATES PATENT AND TRADEMARK OFFICE
CERTIFICATE OF CORRECTION

PATENT NO. : 5,729,357
DATED : March 17, 1998
INVENTOR(S) : Funada et al.

It is certified that error appears in the above-identified patent and that said Letters Patent is hereby corrected as shown below:

Column 11

Line 20, "to respectively" should read --to 1410 respectively--.

Signed and Sealed this

Eighth Day of September, 1998

Attest:

BRUCE LEHMAN

Attesting Officer

Commissioner of Patents and Trademarks